United States Patent [19]
Vacanti

[11] Patent Number: 5,275,468
[45] Date of Patent: Jan. 4, 1994

[54] CHILD RESTRAINING SEAT BELT AID

[76] Inventor: Michael J. Vacanti, 7533 W. 112th St., Bloomington, Minn. 55438

[21] Appl. No.: 967,363

[22] Filed: Oct. 28, 1992

[51] Int. Cl.⁵ .............................................. B60R 22/10
[52] U.S. Cl. ..................................... 297/483; 297/482
[58] Field of Search ................................ 297/482, 483

[56] References Cited

U.S. PATENT DOCUMENTS

| | | |
|---|---|---|
| 3,941,404 | 3/1976 | Otaegui-Ugarte . |
| 3,968,994 | 7/1976 | Chika . |
| 4,610,463 | 9/1986 | Efrom . |
| 4,786,078 | 11/1988 | Schreier et al. ............... 297/483 X |
| 4,848,793 | 7/1989 | Huspen et al. . |
| 4,951,965 | 8/1990 | Brown . |
| 5,016,915 | 5/1991 | Perry . |
| 5,042,838 | 8/1991 | Carter ........................... 297/483 X |
| 5,074,588 | 12/1991 | Huspen . |
| 5,154,446 | 10/1992 | Blake ............................ 297/483 X |

FOREIGN PATENT DOCUMENTS 2617506  11/1977  Fed. Rep. of Germany ...... 280/808

OTHER PUBLICATIONS

Safe Fit Brochure by the Blue Ridge/The Item Company.

*Primary Examiner*—Peter R. Brown
*Attorney, Agent, or Firm*—Haugen and Nikolai

[57] ABSTRACT

The child restraining seat belt aid for redirecting the shoulder strap of a safety belt properly across the chest of a child. The device comprises a plate with the plurality of fingers. A first set of fingers is provided for receiving the lap belt, and a second set of fingers extending at an acute angle from the first set of fingers is adapted to receive the shoulder strap. The acute angle defined is smaller than the angle normally defined by the shoulder strap in relation to the lap belt. The fingers allow the lap belt and shoulder strap to be easily and quickly inserted during installation. The design also facilitates quick removal in an emergency. The device is comprised of a single piece of plastic manufactured using standard plastic injection molding techniques. The device can be adapted for use in either the right seat or the left seat of the automobile. The plate can have a contour conforming to the shape of the child's chest to provide a more comfortable feel. In use, the device properly orients the shoulder strap across the child's chest rather than across the child's chin or neck, thus providing a more affective safety belt arrangement.

24 Claims, 3 Drawing Sheets

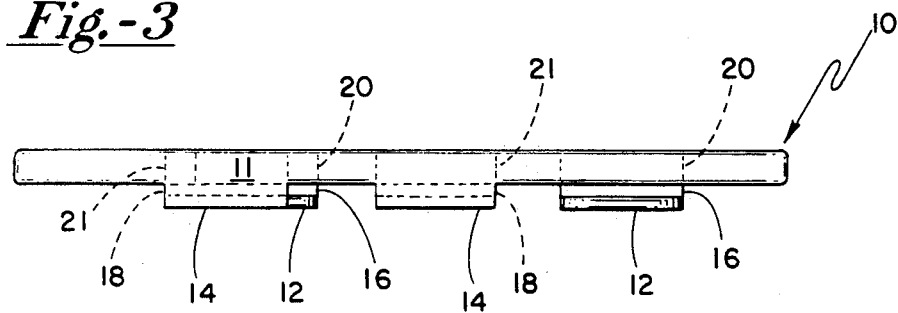
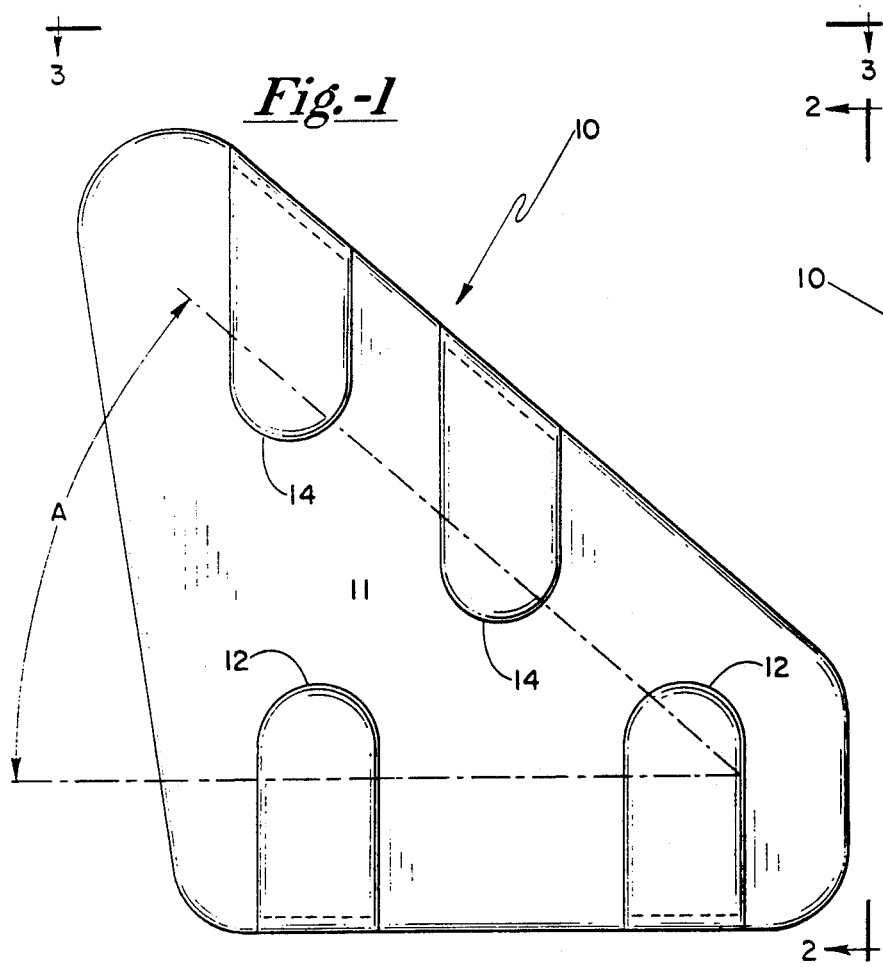
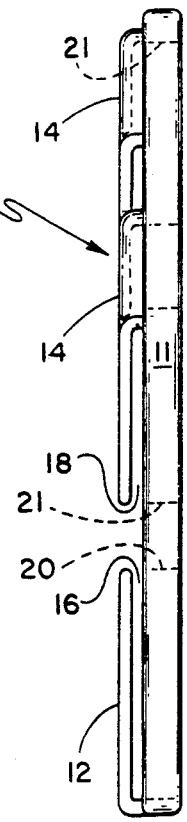

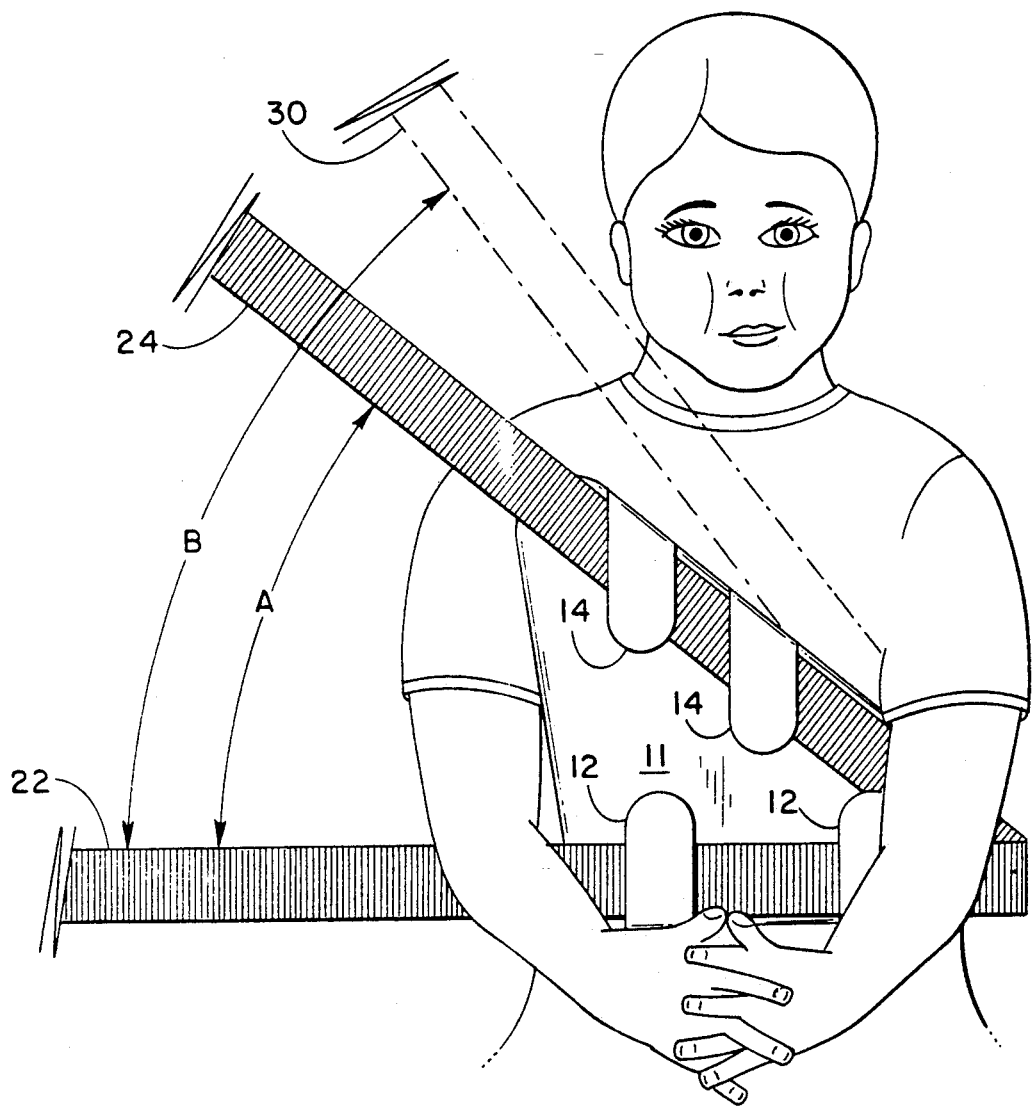

CHILD RESTRAINING SEAT BELT AID

BACKGROUND OF THE INVENTION

I. Field of the Invention

This invention relates generally to vehicle safety restraints, and more specifically to restraints used by children seated in vehicles to properly route the shoulder strap across the child's chest.

II. Discussion of the Prior Art

All automobiles currently manufactured for use in the United States include safety restraints comprised of seat belts to be used by every passenger in the car. These safety restraints typically include a lap belt, and a shoulder strap which is adapted to extend diagonally across the chest of the passenger. The shoulder strap is adapted to extend at a predetermined angle from the buckle, across the chest of the passenger and over the opposite arm, and is secured to an upper portion of the vehicle interior. Unfortunately, all automobile manufacturers design the safety restraints to conform to the anatomy of an adult passenger. Consequently, when a child or a smaller passenger is seated in the vehicle, the extension of the shoulder strap can extend across the passenger in an uncomfortable, ineffective, or dangerous position. Specifically, children often will simply put the shoulder belt behind them, thus rendering the shoulder strap ineffective and unavailable should the automobile crash. Only the lap belt is extended across the lap of the child, which may help reduce injury to the child, but which will not restrain the upper portion of the child from projecting forwardly against a forward seat or the dash of the car. Thus, it can be very dangerous for the child to render the shoulder strap ineffective.

In other instances, the child will simply let the shoulder strap extend across the child's chest and over the opposite shoulder. In this arrangement, the shoulder strap extends closely below the neck of the child. This position is also dangerous for in the event of a subsequent crash, the shoulder strap will restrain the child at the neck from thrusting forward. This is a dangerous point of the child's body to be restricting forward movement. It can cause serious damage to the back, cause the throat to collapse, and possibly even choke the child during the crash due to collapsed windpipes.

Several companies provide various child seat restraining devices, including portable seats which are specifically designed for children. There are many variations of child seats available in the market. However, older children do not always desire to use these seats and wish to sit on a seat like the other passengers using the standard seat belt. This is dangerous as discussed. Further, child seats are expensive, and they are sometimes difficult, time consuming and cumbersome to install or move from one vehicle to the next. Thus, there is a recognized need to provide an inexpensive child safety restraint which is adaptable to the existing seat belt arrangement in automobiles, and which can more properly protect the child should the automobile crash.

The brochure produced by the Blue Ridge/The Item Company advertising the Safe Fit TM shoulder belt adjuster for children addresses the problem that shoulder belts are not adapted to children. However, this devices suffers in that the device provides no extra support to the child. The shoulder strap still concentrates force across a child's abdomen during vehicle impact. Further, the belt is not restrained within the sleeve in a proper arrangement, but rather, is constrained only and may be a loose fitting.

U.S. Pat. No. 5,074,588 to Huspen teaches a child safety restraint. While this device addresses the problem of providing a safety device for a child too large for a baby seat, yet too small for a conventional seat belt/shoulder strap combination, the device requires several parts. Specifically, a stress plate, a pair of shoulder straps, and a crotch strap. It also requires a moderate amount of installation time when adapted to a child.

U.S. Pat. No. 5,016,915 to Perry teaches a child restraint for use with a seat belt in an automobile. This is invention comprises a pillow-like elongated cushion which attaches only to a seat lap belt. It is not meant to be used in connection with a shoulder strap. Thus, there is no teaching of adapting a shoulder strap about a child.

U.S. Pat. No. 3,941,404 to Otaegui-Ugarte teaches a protector for a vehicle occupant. This invention comprises a protective breast plate having an air compartment, wherein the breast plate is rigidly attached to the straps of a vehicle seat belt. Thus, the equipment would need to be provided as standard equipment by the automobile manufacturer. Breast plate 1 is not removable from the straps, nor is there any teaching of redirecting the direction of the diagonal strap such that the device would be adaptable to a child.

U.S. Pat. No. 4,951,965 to Brown teaches a vehicle seat belt retainer for a child. This device teaches a strap adapted to circumscribe the child's lower buttock, and which is releasably securable to the lap belt of the conventional vehicle seat belt. There is no teaching of redirecting the shoulder strap to more properly adapt to the size of a child.

III. Objects

It is accordingly a principal object of the present invention to provide a child restraining seat belt aid which is adaptable to the lap belt and shoulder belt of a standard automobile.

It is a further object of the present invention to provide the child restraining seat belt aid which is suited to redirect the shoulder belt across the child's chest to render the shoulder belt safer and more effective for children.

It is still yet another object of the present invention to provide a child restraining seat belt aid which is comprised of a single piece, and which is easy and inexpensive to manufacture.

It is still yet another object of the present invention to provide a child restraining seat belt aid which can be quickly and easily installed in a standard vehicle, and is portable.

Still yet another object of the present invention is to provide a child restraining seat belt aid which can be used by a child seating in either the right or left seat of an automobile.

Still yet another object of the present invention is to provide a child restraining seat belt aid which distributes the otherwise concentrated seat belt force which is generated by the seat belt across a child's abdomen during car impact.

Other objects, features and advantages of the present invention will become apparent to those skilled in the art through the Description of the Preferred Embodiment, Claims, and drawings herein wherein like numerals refer to like elements.

SUMMARY OF THE INVENTION

The foregoing objects are achieved by providing a child restraining seat belt aid comprised of a plate which restrains the shoulder strap and seat lap belt such that the shoulder strap is safely redirected across the chest of the child when in use. The safety restraint is adapted for use by a passenger in a vehicle having a seat, and a safety belt comprised of a lap belt and a shoulder strap forming a first angle. The safety restraint comprises a plate having a first and second surface. The plate has a first restraining mechanism disposed along a first direction, and a second restraining mechanism disposed along a second direction. The first and second restraining mechanisms together form a second angle less than the first angle which is normally defined by the lap belt and the shoulder strap. Thus, the first and second restraining mechanisms receive the respective shoulder strap and lap belt to redirect the shoulder strap in a more convenient and effective position across the chest of the child. In the preferred embodiment, the plate comprises a substantially rigid material such that the plate will distribute the force of the belts across the abdomen of the passenger in the event of a crash. However, a more flexible plate, such as a plate made of rubber or soft plastic, is also suitable for redirecting the shoulder strap across the child.

The plate preferably has a first, second and third edge defining a substantially triangular shaped member. The first restraining mechanism is disposed along the first edge of the plate for receiving the lap belt, and the second restraining mechanism is disposed along the second edge of the plate for receiving the shoulder strap. Preferably, both the first and second restraining mechanisms are comprised of a plurality of fingers which are integrally defined in the plate. Ideally, the first and second pluralities of fingers are arranged in linear relationships such that the respective shoulder strap and lap belt are threaded beneath the fingers in a linear arrangement. The fingers snuggly restrain the respective lap belt and shoulder strap such that they can be slid underneath the fingers for adjustment purposes, but define a clearance between the plate and the fingers which is slightly smaller than the thickness of the respective shoulder strap or lap belt such that the belts are received in a snug relationship to restrain the respective belts. Thus, the lap belt and shoulder strap will not flop around or become loose and ineffective in the event of a subsequent crash.

The first and second plurality fingers are preferably flexible with respect to the plate to facilitate receiving the lap belt and shoulder strap between the fingers and the plate. In the preferred embodiment, the fingers are offset from the plane of the plate to define a clearance between the fingers and the plate, however, the fingers could also be co-planar with the plate to provide a reversible plate which can be used by a passenger seated in either the right or left seat. In this embodiment, the fingers can flex either direction to receive the seat belt or shoulder strap to provide a reversible safety restraint. The plate preferably has an opening defined beneath each of the fingers to facilitate an easier manufacturing process, however, it is recognized the plate could be entirely solid beneath the respective fingers as well. All of the corners of the plate and fingers are rounded to avoid sharp edges such that the device is comfortable to handle.

BRIEF DESCRIPTION OF THE DRAWINGS

FIG. 1 is a top view of a child restraining seat belt aid illustrating two sets of fingers projecting from the plate, each extending parallel to the plate, wherein the first set of fingers is directed in the horizontal direction, and the second set of fingers is directed in a diagonal direction to define an angle;

FIG. 2 is a side view 2—2 shown in FIG. 1 illustrating how each of the fingers projects from the plate to define a notch or clearance between the plate and the respective finger for receiving either the lap or shoulder seat belt;

FIG. 3 illustrates a top view 3—3 shown in FIG. 1;

FIG. 4 illustrates the child restraining seat belt aid adapted to a standard lap belt and shoulder strap and protecting a child;

DESCRIPTION OF THE PREFERRED EMBODIMENT

Figure 5:
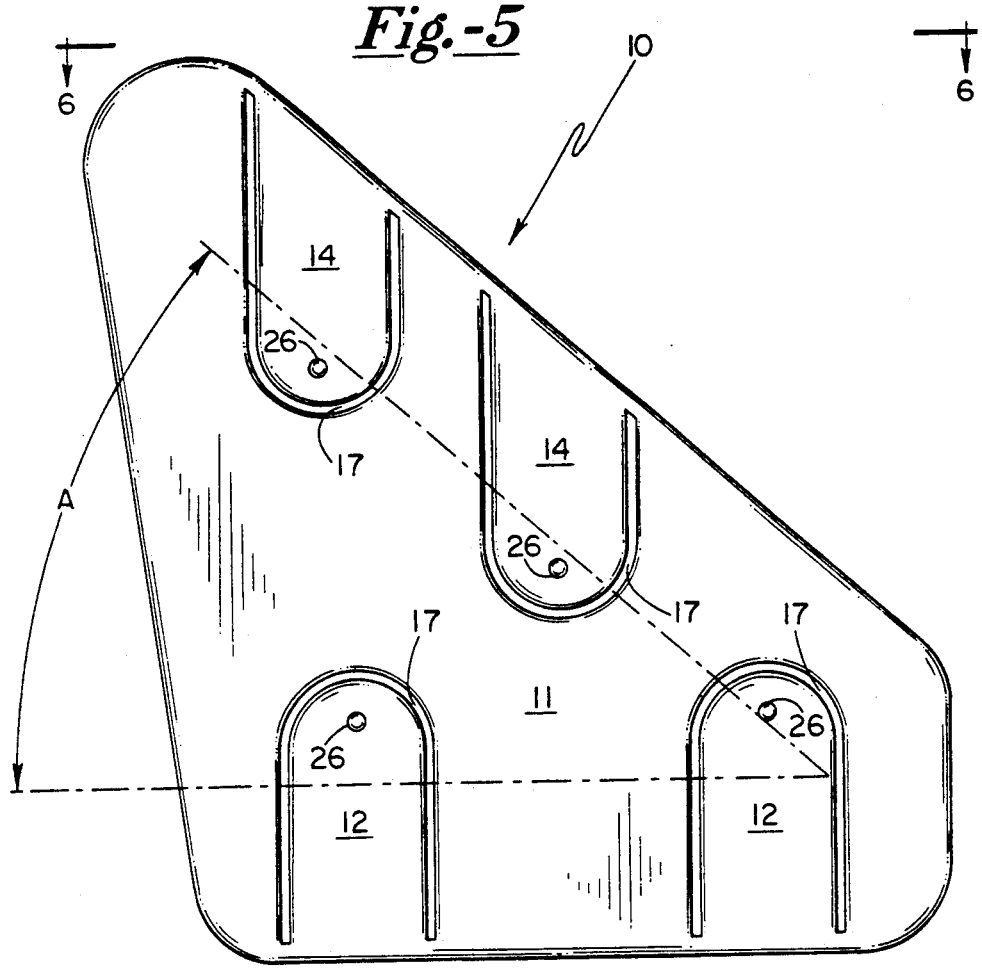
FIG. 5 illustrates an alternative preferred embodiment of the invention wherein the fingers are coplanar with the plate to facilitate a reversible device.

Referring to FIG. 1, a child restraining seat belt aid is illustrated according to the preferred embodiment of the present invention and is labeled generally at 10. Seat belt aid 10 comprises a generally triangular shaped and substantially rigid planar plate 11, preferably comprised of injection molded plastic. Any generally rigid material is preferred and suitable, such as aluminum, and limitation to injection molded plastic is not to be inferred. However, plate 11 could also be comprised of a pliable or resilient material, such as rubber or a soft plastic, which has sufficient strength to restrain the shoulder strap and lap belt in the correct angular relationship as will be discussed shortly. Hence, limitation to a substantially rigid material is not to be inferred. Plate 11 has a first set of seat lap belt constraining fingers 12, and a second set of shoulder strap constraining fingers 14. Both fingers 12 and 14 are also made of plastic and are integral to plate 11. Thus, the entire assembly can be manufactured in a one step process using plastic injection molding techniques. Each of the first set of fingers 12 extend from a lower horizontal edge of plate 11 inward to the center of plate 11, and define a respective notch or clearance 16 between the respective finger and plate 11, as shown in FIG. 2. Each of the second set of fingers 14 extend inwardly from an upper diagonal edge of plate 11 toward the center of plate 11 as shown. Fingers 14 also define a notch or clearance between the respective finger and plate 11 identified at 18, as illustrated in FIG. 2. An opening 20 and 21 is formed in plate 11 directly below the respective fingers 12 and 14, and which has a shape conforming to the profile of the respective fingers. These openings may serve to ease the manufacturing process. However, it is recognized plate 11 can extend below the respective fingers 12 and 14 as well, and limitation to a plate having openings 20 and 21 is not to be inferred. Each of fingers 12 and 14 terminate at a curved or arcuate tip to eliminate pointed edges and facilitate receiving the respective strap. Referring to FIG. 2, each of fingers 12 and 14 extend outward a predetermined distance from plate 11, such as ⅜", to define a respective clearance 16 and 18 of 3/16" with respect to plate 11. However, limitation to these design dimensions are not to be inferred. Each of fingers 12 and 14 preferably have a thickness of 3/16", and plate 11 has a thickness dimension of ⅜". All of the corners and edges of plate 11, and fingers 12 and 14 are rounded to provide a more easily handleable device.

Referring again to FIG. 1, the first set of fingers 12 extend in a first or horizontal direction, and are adapted to receive a lap seat belt 22 of a standard automobile in clearances 16. The second set of fingers 14 extend in a second diagonal direction, and form an acute angle "A" with respect to first set of fingers 12. The second set of fingers 14 are adapted to receive the shoulder seat belt 24 provided in a standard automobile in notches or clearances 18, as shown in FIG. 2. The dimension of clearances 16 and 18 are substantially equal to the thickness of a standard lap belt and shoulder belt such that the seat belt is received between fingers 12 and 14, and housing 10 in a fairly snug interface fit. While the fit is fairly snug, the seat belt still can be slid in the respective longitudinal direction such that it can be properly oriented without binding between the respective fingers, or between the fingers and the seat belt buckle.

Referring now to FIG. 4, plate 11 is shown in use and adapted to a standard seat belt arrangement in an automobile to properly protect a child. A standard lap belt 22 is guided by the user or parent into the respective clearances 16 from above fingers 12, and pulled taught. Similarly, a standard shoulder strap 24 is adapted to plate 11 by slipping the shoulder strap 22 into respective clearances 18 from below respective fingers 14, and pulled taught. Both lap belt 22 and shoulder strap 24 are received in a snug fit in respective clearances 16 and 18 such that they can be readily adjusted, yet do not slip out from under respective fingers 12 or 14.

Still referring to FIG. 4, the otherwise standard orientation of shoulder belt 24 is shown and represented as dotted lines 30. As shown, shoulder belt 30 would normally extend from a buckle (not shown) from under a child's arm, across the chest and under the chin or across the neck of the child to a securing point on the sides or ceiling of the automobile interior. Without the use of plate 11, shoulder strap 30 normally extends in a dangerous position, and does not provide adequate protection for the child in the event of a crash. The normal orientation of shoulder strap 24 defines an acute angle "B" with respect to lap belt 22, as shown. By implementing plate 11 to the standard seat belt arrangement, shoulder strap 24 is redirected, as shown, across the chest of the child and then eventually upward to the standard fastening point in the interior of the car. When plate 11 is implemented, the shoulder strap 24 defines an acute angle "A" with respect to lap belt 22, as shown, wherein angle "A" is less than angle "B". Fingers 12 maintain the lower lap belt 22 in an appropriate position across the child's lap. Thus, plate 11 adapts a standard seat belt arrangement, which normally is designed to adapt to an adult, to a child having a much smaller build than an adult. While in the preferred embodiment of the present invention plate 11 is substantially planar, is recognized plate 11 could have a contour adapted to the child's chest contour to provide a more custom fit. Hence, limitation to a planar plates 11 is not be inferred.

A further feature of the present invention is that the plate 11 evenly distributes the force of the seat belt onto the child in the event the child is thrown forward in an automobile crash. The structural rigidity of plate 11 provides extra support and supplements the benefits of the standard seat belt straps. Thus, a concentrated force will be evenly distributed to the child's abdomen.

Still referring to FIG. 4, it is noted both seat lap belt 22 and shoulder strap 24 can be easily removed from fingers 12 and 14 in the event the buckle of the seat belt becomes inoperable, such that the child can slip between lap belt 22 and shoulder strap 24 in an emergency evacuation. Thus, plate 11 does not significantly inhibit the child from escaping a vehicle should the buckle become inoperable in an emergency.

Each of fingers 12 and 14 have a sufficient thickness such that they are slightly flexible with respect to plate 11. Thus, they can flex slightly inward or outwardly when facilitating adaption to the respective seat belt. However, the fingers have a sufficient strength such that they will not easily break or snap off inadvertently while being adapted or removed from the seat belt, or in the event of a crash when the child is thrusted forward. This feature helps ensure that shoulder strap 24 is not snapped toward the neck of the child in the event of a crash.

In the preferred embodiment of the present invention, plate 11 preferably has the following dimensions. The lower edge preferably extends 9", the left vertical edge approximately 12", the diagonal edge 13½", and the right vertical edge 3". Again, the dimensions described are preferable for a child, but no limitation to these dimensions is to be inferred. Again, the thickness of plate 11 is about ⅜", and the thickness of fingers 12 and 14 is 3/16", thus defining a clearance of 3/16".

Figure 6:
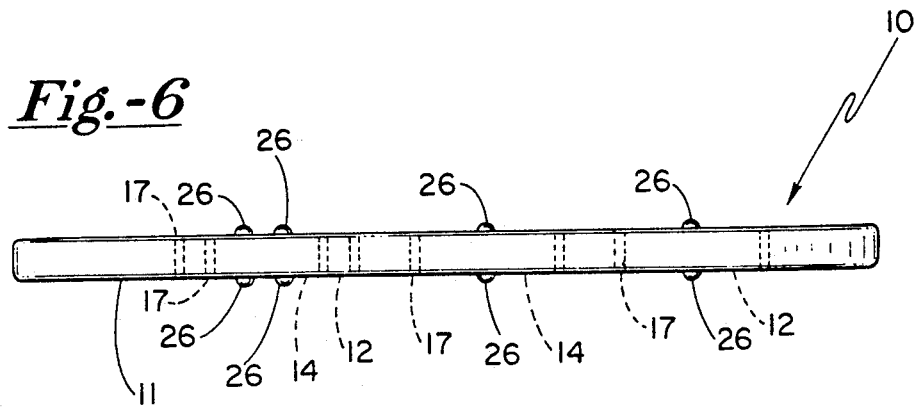
FIG. 6 illustrates a side view 5—5 of FIG. 5.

In an alternative embodiment of the present invention shown in FIGS. 5 and 6, each of fingers 12 and 14 is designed to be coplanar with plate 11 and defined by an elongated and arcuate slit 17. This allows the respective finger to be flexed slightly outward to receive either the lap belt 22 or the shoulder strap 24. However, this design facilitates a plate 11 which is adaptable to be used in either the right or left seat of a car. To facilitate constraining lap belt 22 and should strap 24 under the respective fingers, a dome shaped tab 26 is defined on both sides at the tip of respective fingers 12 and 14 to constrain the respective belt between the dome like projection 26 and the notch defined by the respective finger.

It is noted plate 11 could also have a more rectangular shape with fingers 12 and 14 defined in the acute angle pattern described. Hence, limitation to a triangular plate 11 is not to be inferred. Further, other types of fasteners could be used to accept belt 22 and shoulder strap 24, such as slits defined in place of fingers 12 and 14 at similar locations. Here, the respective belts would be threaded through the slits. While these slits are equivalent functioning design alternatives, the fingers 12 and 14 are believed to be superior.

In summary, the present invention is adapted to safely redirect the shoulder strap of a standard automobile properly across the chest of a child to provide a safe and effective implementation of a standard safety belt. The device is easily adapted to the lap belt and shoulder strap, can be easily and quickly manufactured using standard plastic injection molding techniques, and is affordable. The device can be quickly installed to the seat belt arrangement, and can be quickly removed in an emergency.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A safety restraint for use by a passenger in a vehicle having a seat, and a safety belt comprised of a lap belt and a shoulder strap together forming a first angle, said restraint comprising:
a plate having a first and second surface defined on opposite sides of the plate, said plate having a first restraining means disposed along a first direction for restraining said lap belt, and a second restraining means disposed along a second direction for restraining said shoulder strap, wherein said first and second restraining means form a second angle less than the first angle defined by the lap belt and the shoulder strap to redirect the shoulder strap in a more convenient position for the passenger, wherein said first and second restraining means are integral to both said first and second surface and are accessible from both said first and second surfaces.

2. The safety restraint as specified in claim 1 wherein said plate is substantially rigid.

3. The safety restraint as specified in claim 1 wherein said plate has a first, second and third edge defining a substantially triangular shape, wherein the first restraining means is disposed along the first edge of said plate for receiving said lap belt, and the second restraining means is disposed along the second edge of said plate for receiving said shoulder strap.

4. The safety restraint as specified in claim 3 wherein said first restraining means comprises a plurality of first fingers integrally defined in said plate, said plate having an opening defined about each said plurality of fingers.

5. The safety restraint as specified in claim 4 wherein said second restraining means comprises a plurality of second fingers defined in said plate, said plate having an opening defined about each said second plurality of fingers.

6. The safety restraint as specified in claim 5 wherein said first and second pluralities of fingers are each arranged in a substantially linear relationship.

7. The safety restraint as specified in claim 4 wherein said first plurality of fingers are flexible with respect to said plate.

8. The safety restraint as specified in claim 7 wherein said plurality of fingers are accessible from either the first or second surface of said plate to provide a reversible safety restraint adaptable to a left or right seat in the vehicle.

9. The safety restraint as specified in claim 4 wherein said first plurality of fingers are substantially coplanar with said plate.

10. A safety restraint for use by a passenger in a vehicle having a seat, and a belt comprised of a lap belt and a shoulder strap which is located at a first position, said straps together forming a first angle, said restraint comprising:
a plate having a first and second surface defined on opposite sides of said plate, said first surface including a first plurality of fingers disposed along a first direction, and a second plurality of fingers disposed along a second direction, wherein said first and second fingers together form a second angle less than the first angle defined by the lap belt and the shoulder strap, said second plurality of fingers redirecting the shoulder strap to a second position across the abdomen of the passenger of a smaller stature rather than proximate the passenger's neck when adapted to the safety belt, wherein at least one of said first and second plurality of fingers extends inward toward a central portion of said first plate surface and are disposed substantially parallel to each other.

11. The safety restraint as specified in claim 10 wherein said plate is substantially rigid.

12. The safety restraint as specified in claim 10 wherein said plate has a first, second and third edge defining a substantially triangular shape, wherein the first plurality of fingers is disposed along the first edge of said plate for receiving said lap belt, and the second plurality of fingers is disposed along the second edge of said plate for receiving said shoulder strap.

13. The safety restraint as specified in claim 12 wherein said first and second pluralities of fingers are each arranged in a substantially linear relationship.

14. The safety restraint as specified in claim 10 wherein said first plurality of fingers are flexible with respect to said plate.

15. The safety restraint as specified in claim 10 wherein said first plurality of fingers are substantially coplanar with said plate.

16. The safety restraint as specified in claim 10 wherein said first plurality of fingers are accessible from either the first or second surface of said plate to provide a reversible safety restraint adaptable to a left or right seat in the vehicle.

17. In combination, a safety restraint for use by a passenger in a vehicle, having a seat and a safety belt comprised of a lap belt and shoulder strap which is located at a first position, said straps together forming a first angle when said restraint is not adapted thereto, said restraint comprising:
a plate having a first and second major surface defined on opposite sides of the plate, said first major surface including a first restraining means for restraining the lap belt longitudinally disposed in a first direction and a second restraining means for restraining the shoulder strap disposed longitudinally in a second direction, wherein said longitudinally disposed first and second restraining means together form a second angle less than said first angle originally defined by the lap belt and the shoulder strap, said second restraining means for redirecting the shoulder strap to a second position across the abdomen of the passenger of a smaller stature rather than proximate the passenger's neck when adapted to said safety belt.

18. The safety restraint as specified in claim 17 wherein said plate has a first, second and third edge defining a substantially triangular shape, wherein said first restraining means is longitudinally disposed along the first edge and the second restraining means is longitudinally disposed along the second edge.

19. The safety restraint as specified in claim 17 wherein said first restraining means comprises a plurality of first fingers integrally defined in said plate.

20. The safety restraint as specified in claim 19 wherein said second restraining means comprises a plurality of second fingers defined in said plate.

21. The safety restraint as specified in claim 20 wherein said first and second plurality of fingers are each arranged in a substantially linear relationship, respectively.

22. The safety restraint as specified in claim 19 wherein said first plurality of fingers are flexible with respect to said plate.

23. The safety restraint as specified in claim 22 wherein said first plurality of fingers are accessible from either the first or second surface of said plate to provide a reversible safety restraint adaptable to a left or right seat in the vehicle.

24. The safety restraint as specified in claim 19 wherein said first plurality of fingers are substantially coplanar with said plate.

* * * * *